United States Patent [19]

Raad et al.

[11] Patent Number: 4,830,412
[45] Date of Patent: May 16, 1989

[54] STARTING SYSTEM AND METHOD USING A HYBRID PERMANENT MAGNET/INDUCTION MACHINE

[75] Inventors: Bernard A. Raad; Clarence F. Dolan, both of Rockford, Ill.

[73] Assignee: Sundstrand Corporation, Rockford, Ill.

[21] Appl. No.: 112,701

[22] Filed: Nov. 30, 1987

[51] Int. Cl.⁴ .................... F02N 11/00; F02N 11/04; H02P 3/00
[52] U.S. Cl. .................................. 290/31; 290/38 R; 290/46; 322/10
[58] Field of Search .................. 290/31, 38 R, 46, 4 R, 290/4 C; 310/211; 322/10, 29

[56] References Cited

U.S. PATENT DOCUMENTS

| | | |
|---|---|---|
| 2,432,436 | 12/1947 | Morrill . |
| 2,488,437 | 11/1949 | Schaefer . |
| 2,493,102 | 1/1950 | Brainard . |
| 3,809,914 | 5/1974 | Kugore et al. ............... 290/38 R |
| 3,867,677 | 2/1975 | Fletcher et al. . |
| 4,139,790 | 2/1979 | Steen . |
| 4,330,743 | 5/1982 | Glennon ........................ 322/10 |
| 4,473,752 | 9/1984 | Cronin . |
| 4,481,459 | 11/1984 | Mehl et al. .............. 290/38 R X |
| 4,568,846 | 2/1986 | Kapadia .................... 310/211 X |
| 4,697,090 | 9/1987 | Baker et al. ............. 290/38 R X |

Primary Examiner—William M. Shoop, Jr.
Assistant Examiner—Sharon D. Logan
Attorney, Agent, or Firm—Marshall, O'Toole, Gerstein, Murray & Bicknell

[57] ABSTRACT

A starting system and method for starting a prime mover connected to a generator by an actuable torque link utilizes a hybrid permanent magnet/induction machine having a rotor coupled to a rotor of the main generator and a stator having windings therein. The method includes the step of applying AC power to the hybrid machine stator windings so that the hybrid machine initially acts as an induction motor to accelerate the hybrid machine rotor, following which the hybrid machine acts as a synchronous motor to rotate the main generator rotor at a particular speed DC power is then applied to a main generator field winding and AC power is supplied to a set of main generator armature windings so that the main generator operates as a synchronous motor to develop motive power the torque link is activated once the main generator is operating as a synchronous motor to bring the prime mover up to self-sustaining speed. Inasmuch as the hybrid machine may comprise part of a brushless synchronous generator, the present system and method does not require additional components and reduces transients in the AC power applied to the hybrid machine and generator.

7 Claims, 3 Drawing Sheets

STARTING SYSTEM AND METHOD USING A HYBRID PERMANENT MAGNET/INDUCTION MACHINE

TECHNICAL FIELD

The present invention relates generally to systems and methods for starting a prime mover, and more particularly to prime mover starting systems and methods which do not require the use of a dedicated starter motor.

BACKGROUND

In the past, prime movers which supply motive power to generating systems have been started from stand-still by either a dedicated starter motor or by components of the system which are subsequently driven by the prime mover to produce electrical power. The use of a dedicated starter motor, however, results in the addition of a little-used component to the generating system, thereby undesirably incresing the size and weight thereof. Thus, the latter approach of using the generating system components to start the prime mover has found increasing acceptance.

One example of the latter approach is disclosed in Mehl U.S. Pat. No. 4,481,459, assigned to the assignee of the present application. This patent discloses a brushless generator which is driven by a prime mover in a generating mode to produce AC power and which is capable of operation in a starting mode to develop motive power for starting the prime mover. In the starting mode, AC power at an increasing voltage and frequency is provided by an inverter to a permanent magnet generator (PMG) of the brushless generator. This accelerates a rotor common to the PMG and a main generator up to the synchronous speed of the main generator. Once this synchronous speed is reached, AC power at the synchronous frequency of the main generator is applied to the stator windings thereof to cause the main generator to operate as a synchronous motor and thereby develop starting torque. A torque converter which is coupled between the main generator and prime mover is then actuated to transfer the starting torque to the prime mover to bring it up to self sustaining speed.

Cronin U.S. Pat. No. 4,473,752, discloses a starter-generator machine which can be used to start a aircraft engine. The machine includes a rotor-shaped stator which is fixed within a squirrel cage induction rotor. The rotor in turn includes an array of magnets attached on the outer circumference thereof. The machine is operated as a starter by applying three-phase AC power to windings disposed within the rotor-shaped stator. This in turn accelerates the induction rotor and the permanent magnets. Once a predetermined rotor speed is reached, AC power is applied to stator windings in a outside stator surrounding the rotor to synchronize the rotating magnetic field developed by the permanent magnets with the rotating field created in the stator so that motive power is developed. The motive power is transferred to a prime mover to start same.

A starting system for starting a synchronous motor which in turns drives a generator is disclosed in Fletcher U.S. Pat. No. 3,867,677. An induction starting motor is provided AC power to accelerate the rotor of the synchronous motor and generator. Electrical power is thereafter supplied to the synchronous motor to cause it to develop motive power which is thereafter provided to the generator. By rotating the synchronous motor before applying power thereto, large power lines disturbances are said to be prevented.

Fletcher also discloses a circuit for operating the motor at unity power factor. A phase comparator compares the phase of the input voltage to the phase of the input current to develop an error signal which controls the motor field to keep the motor at unity power factor.

Steen U.S. Pat. No. 4,139,790, discloses a synchronous motor having a rotor which includes a plurality of magnets disposed in apertures within the rotor. A series of electrically conductive bars are disposed about the entire circumference of the rotor and the bars are connected together to form a squirrel cage winding. The Steen motor is operated in an induction mode by applying AC power to stator windings until the synchronous speed of the motor is substantially reached. Thereafter, synchronous operation is achieved due to the interaction of the magnet field developed by the magnets in the rotor with the magnetic field established by the current flowing in the stator windings.

Other patents disclosing permanent magnet rotors having in current conducting bars in a squirrel cage configuration include Morrill U.S. Pat. No. 2,432,436, Schaefer U.S. Pat. No. 2,488,437, and Brainard U.S. Pat. No. 2,493,102.

It has been found that the direct application of AC power to a generator to cause it to operate as a motor results in a large transient in the power provided to the generator. The magnitude of the transient may be such as to render portable supplies, such as ground power carts, unsuitable for this use. The attempt by the Fletcher et al. system to reduce power transients by rotating the synchronous generator rotor before applying power thereto is not entirely successful since both the synchronous motor and generator rotors are driven by the induction starting motor. This high-inertia load on the starting motor results in a significant transient at teh time AC power is applied to the induction motor.

Copending patent application Ser. No. 063,296, filed June 17, 1987 in the name of Raad et al, entitled "Prime Mover Starting System and Method" (Sundstrand Docket No. B02405-AT1-USA) discloses a starting system and method for starting a prime mover connected to a generator by a torque link. An induction motor is included having a torque rating substantially equal to the minimum torque required to rotate the rotor of the generator from rest to a particular speed in a predetermined time period while the torque link is deactuated. Also provided are a source of electrical power, contactors for connecting the source of electrical power to the induction motor when the torque link is deactuated to accelerate the generator rotor to the particular speed, a second set of contactors for connecting the source of electrical power to the generator windings once the generator rotor has reached a particular speed to cause the generator to operate as a synchronous motor and a torque link actuator for actuating the torque link once the generator is operating as synchronous motor to bring the prime mover up to starting speed. The usual large-magnitude transient developed in the source of electrical power is thus broken down into several transients of lesser magnitude.

DISCLOSURE OF INVENTION

In accordance with the present invention, a starting system and method for starting a prime mover using generating system components reduces transients in the AC power supplied to the generating components without requiring the use of separate motor or other electromagnetic structures.

More particularly, a starting system and method for starting a prime mover selectively coupled to a rotor of a main generator by an actuable torque link utilizes a hybrid permanent magnet/induction machine having a rotor coupled to a generator rotor and stator windings disposed in a stator, a source of AC power selectively connectable to the stator windings of the hybrid machine to accelerate the hybrid machine rotor in an induction mode to a synchronous speed, at which time the machine operates in a synchronous mode as a motor to rotate the generator rotor at a particular speed. Means are also included for applying power to generator field and armature once the generator is rotating at the particular speed so that teh generator operates as a synchronous motor. Thereafter, the torque link is actuated to connect the generator to the prime mover to bring the prime mover up to self-sustaining speed.

Of particular significance is that the hybrid machine and main generator may comprise parts of a brushless generator. Thus, the starting function is achieved without the use of additional and little-used components.

Further, since the hybrid machine is capable of operating in an induction mode to accelerate the generator rotor, complex and expensive power conditioning circuits are not required to bring the generator rotor up to the particular speed.

In accordance with a further aspect of the invention, the rotor of the hybrid machine includes at least one permanent magnet having two poles separated by interpole regions and a squirrel cage winding disposed only in the interpole regions. This is unlike the rotor disclosed in Steen in which the conductors of the squirrel cage winding are disposed between the magnets and the stator. As compared with the Steen rotor, the effective distance between the magnet and stator of the present hybrid machine can be substantially reduced.

BEST MODE FOR CARRYING OUT THE INVENTION

Figure 1:
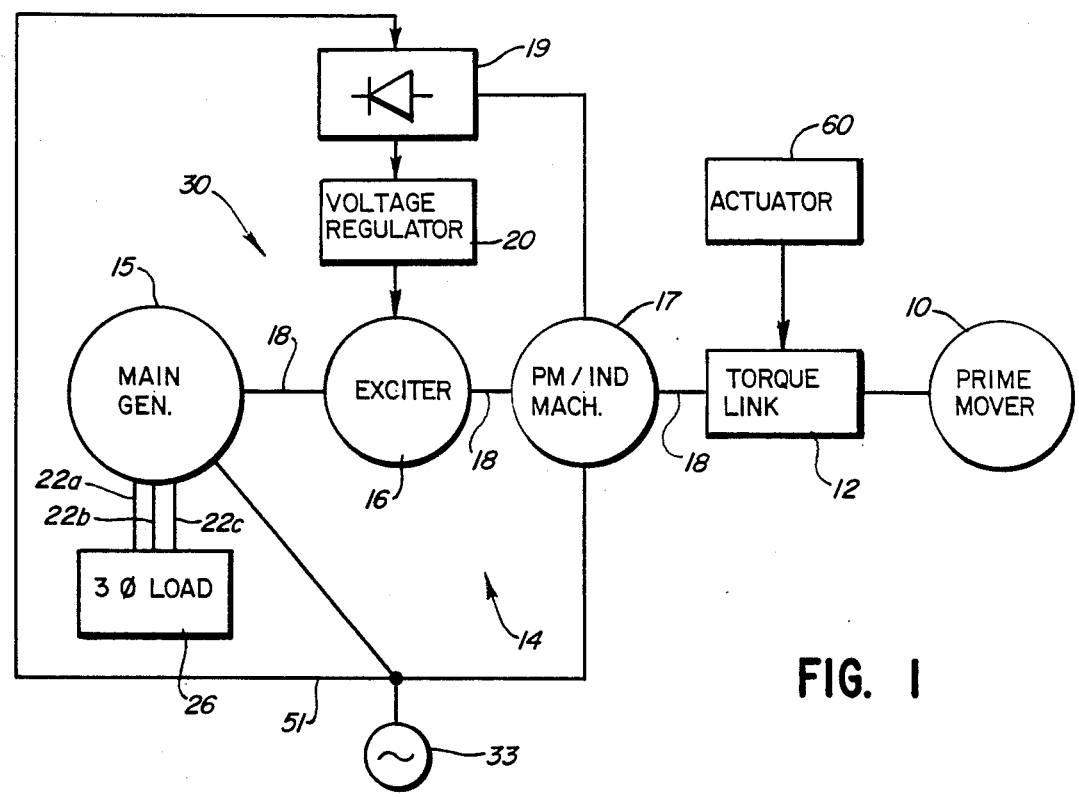
FIG. 1 is a block diagram of a starting system according to the present invention which may also be used in a generating mode to provide power to a load.

Referring now to FIG. 1, a prime mover 10 is connected by an actuable torque link 12 to a generator 14, which is preferably of the brushless, synchronous type having three phases. The generator 14 includes a main generator 15, an exciter 16 and a hybrid permanent magnet/induction machine 17 each having rotors interconnected by a shaft 18. During operation in a generating mode, the prime mover 10 develops motive power which is transferred by the torque link 12 to the shaft 18. The hybrid machine develops AC power which is rectified and regulated by a three phase full wave rectifier bridge 19 and a voltage regulator 20. The power developed by the circuit 20 is provided to the exciter 16, which in turn develops excitation for the main generator 15. The main generator 15 develops polyphase poewr on output lines 22a–22c which are coupled to a polyphase load 26.

Figure 2:
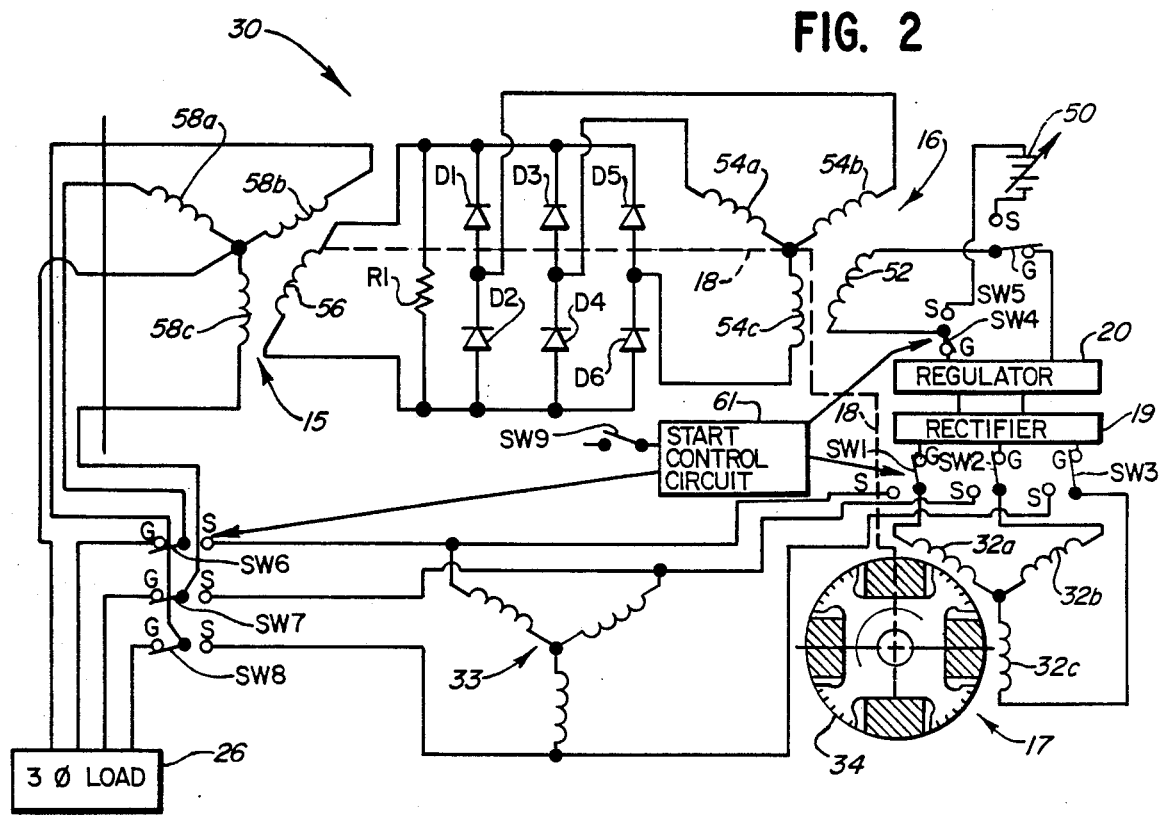
FIG. 2 is a combined schematic and block diagram of a portion of the system shonw in FIG. 1.
Figure 4:
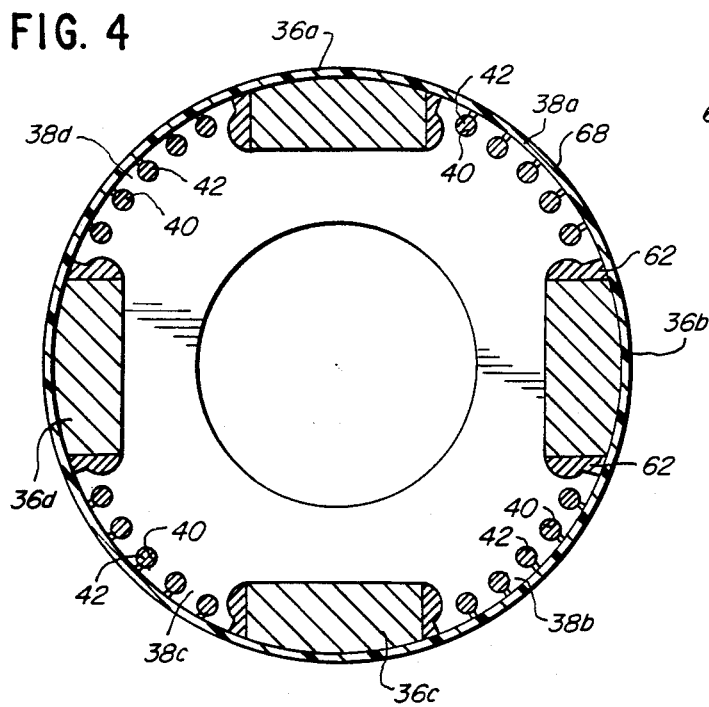
FIG. 4 is a sectional view taken along the lines 4—4 of FIG. 3.
Figure 3:
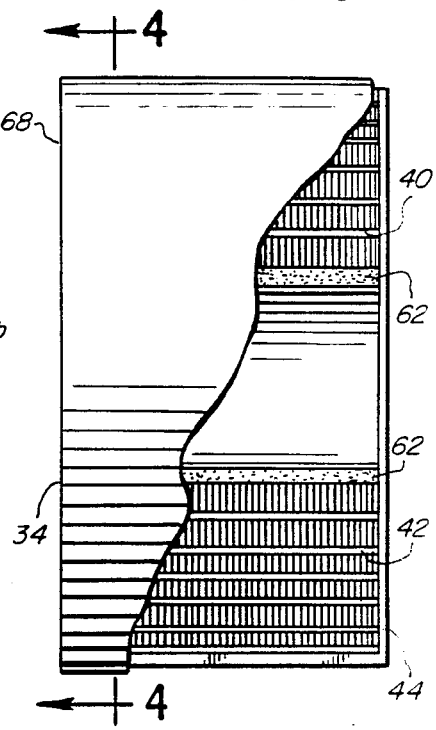
FIG. 3 is a side elevational view, with a portion of the retaining sleeve broken away, illustrating the rotor of the hybrid permanent magnet/induction machine shown in FIGS. 1 and 2.
Figure 5:
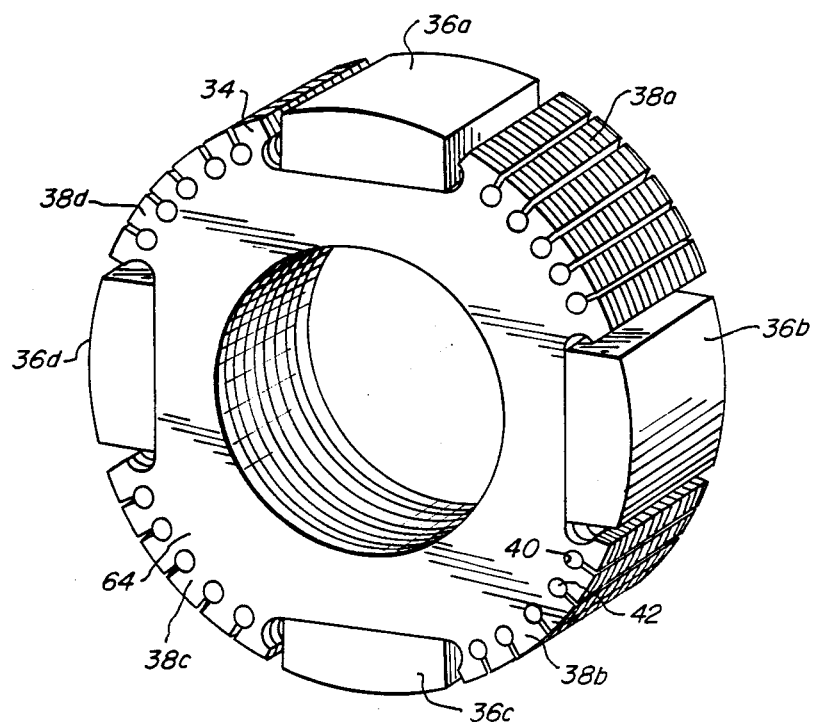
FIG. 5 is a perspective view of the rotor illustrated in FIGS. 3 and 4 without the retaining sleeve and flux barriers.

Referring also to FIG. 2, the electromagnetic machines 15-18 are operable as a starting system 30 to accelerate the prime mover from standstill up to self-sustaining speed to thereby start same. In this generating mode of operation, the torque link 12 is deactuated and constant-frequency AC power at, for example, 400 hz., is supplied to armature windings 32a–32c of the hybrid machine 17 by an external AC power supply 33 through ganged switches SW1–SW3 which are movable between generating and starting positions G and S, respectively. If desired, a 3-phase contactor may alternatively be used in place of switches SW1–SW3. As seen specifically in FIGS. 3-5, a rotor 34 of the hybrid machine 17 includes at least one, and preferably four magnets 36a–36d having poles which are separated by interpole regions 38a–38d. The rotor 34 may include additinoal magnets, if desired. Disposed in slots 40 in the interpole regions 38a–38d are a plurality of electrically-conductive bars 42 which are electrically connected together by end rings 44, only one of which is shown in FIG. 3. The bars 42 and end rings 44 together form a squirrel cage winding which develops an induced magnetic field in response to AC power in the armature windings 32a–32c. The hybrid machine 17 thereby operates in an induction mode to accelerate the shaft 18.

Eventually the speed of the rotor 34 of the hybrid machine reaches near-synchronous speed. At this time, pull-in to synchronous speed occurs due the interaction of the magnetic field established by the magnets 36a–36d with the magnetic field developed by the current flowing in the armature windings 32a–32c. Thereafter, the hybrid machine acts as a permanent magnet synchronous motor.

A short time after pull-in of the hybrid machine rotor 34, a pair of ganged switches SW4–SW5 are moved to a starting position S. DC power is then supplied to an exciter field winding 52 by either a controllable external DC power supply 50 or, as shown by the line 51, the external source of AC power 33, the rectifier bridge 19 and the voltage regulator 20. The application of controlled DC power to this winding coupled with rotation of the shaft 18 causes AC power to be developed in a set of rotating armature windings 54a–54c. This AC power is rectified by a rotating rectifier circuit comprising diodes D1-D6 connected in a bridge configuration and the resulting DC power is coupled across a resistor R1 and a main generator field winding 56. At the same time that the switches SW4 and SW5 are moved to the start position, three switches SW6-SW8 are also moved to a start position S so that constant frequency AC power is provided by the power supply 33 to a set of main generator armature windings 58a–58c. As before, the switches SW6-SW8 may alternatively be replaced by a 3-phase contactor. In the preferred embodiment, the synchronous speed of the hybrid machine 17 is equal to the synchronous speed of the main generator 15. Thus, when the main generator armature windings 58a–58c receive the constant-frequency power from the AC power source 33 and DC power is applied to the main generator field winding 56, the main generator 15 is operated as a synchronous motor. The motive power developed by the main generator 15 is transmitted by the shaft 18 to the torque link 12. At this point, an actuator 60 (FIG. 1) is operated to close the torque link 12 and thereby transfer the motive power to the prime mover 10 to bring same up to self-sustaining speed. Once self-sustaining speed has been reached, the switches SW6–SW8 are moved to a neutral position out of contact with the starting position S and generating position G so that the armature windings 58a–58c are disconnected from the power supply 33. The prime mover may then be accelerated to operating speed.

After the prime mover 10 has started and reached operating speed, the switches SW1–SW8 are moved to the generating position G so that normal generating operation can commence.

Figure 6A:
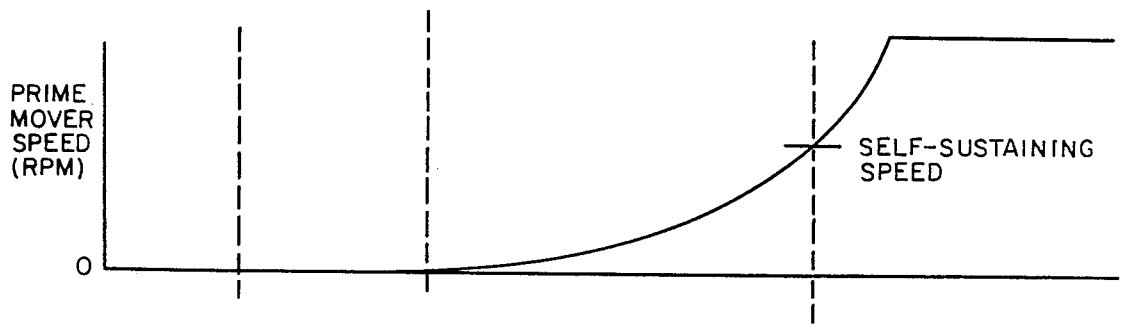
FIGS. 6a-6c are graphs illustrating the operation of a prior art system (FIG. 6b) and the method of the present invention (FIG. 6c) for increasing prime mover speeds (FIG. 6a).
Figure 6B:
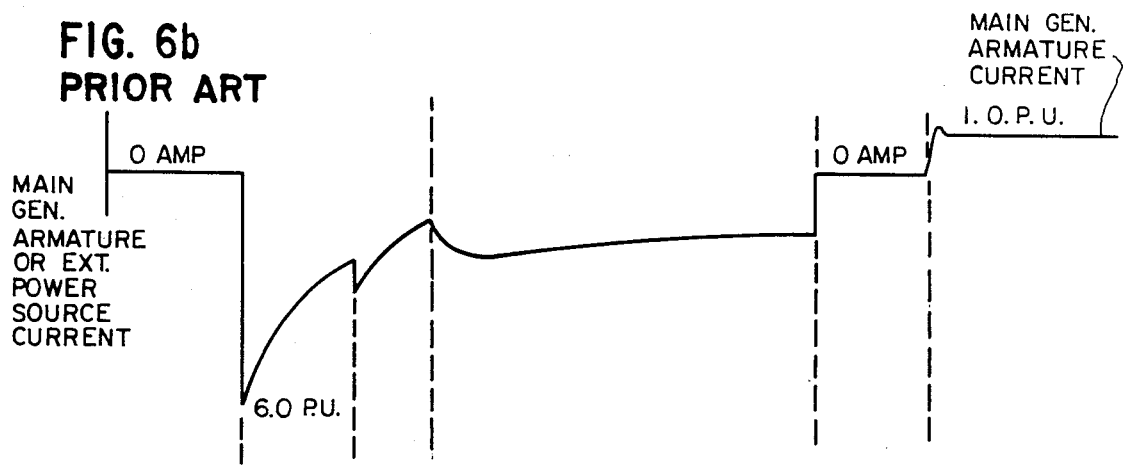
Figure 6C:
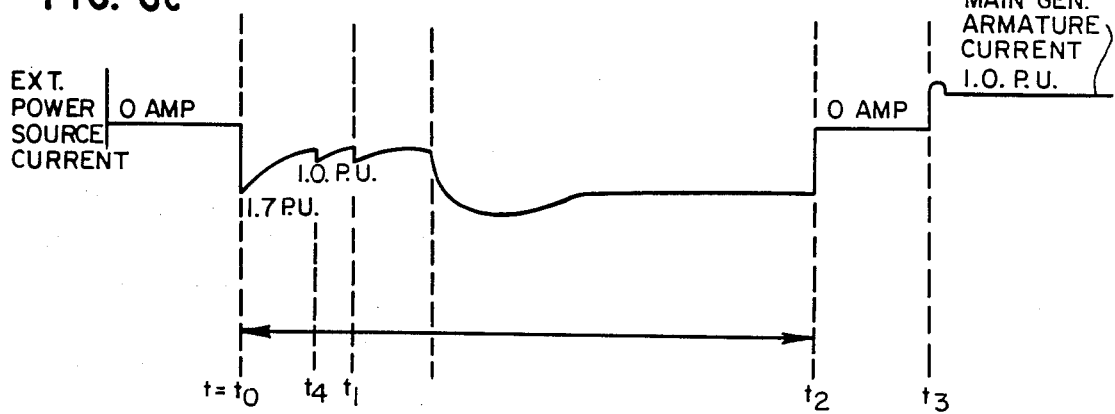

Referring now to FIGS. 6a–6c, the operation of a typical prior art starting system and method (FIG. 6b) will be compared with the operation of the starting system and method of the present invention (FIG. 6c). The prior art method illustrated in 6b comprises direct application of polyphase constant-frequency AC power supplied by an AC power source to the main generator armature windings whereby the main generator rotor includes an amortisseur circuit. In this case, application of power to the armature windings at time $T=t_0$ results in a significant increase (in a negative direction) of main generator armature current supplied by the AC power source. This current transient may reach six or more times the rated current of the main generator (alternatively referred to as 6 per unit or 6 P.U.). The current thereafter exponentially decreases as the speed of the main generator rotor increses until a second point of time $T=t_1$ is reached, at which point the rotational speed of the main generator rotor pulls in or synchronizes with the speed of the rotating field developed by current in the main generator armature windings. This transient arises as a result of the inherent transient and subtransient reactances of the machine.

After the time $T=t_1$, the main generator armature current again decreases in exponential fashion until the main generator rotor is connected by means of a torque link or other coupling device to the prime mover 10. Thereafter, the prime mover speed increases up to self-sustaining speed at a time $T=t_2$. At this time, a generator line contactor or other switching device may be opened to disconnect the main armature windings from the AC power source. The generator current therefore drops to zero and the prime mover accelerates to operating speed.

At time $T=t_3$, the generator line contactor is again closed to allow normal generating operation to occur.

Referring now to FIG. 6c, the starting system and method of the present invention breaks up the large magnitude transient encountered with the prior art system into several smaller magnitude transients which are more easily handled by the external AC power source. At time $T=t_0$, the torque link is deactuated and 400 hz. power is applied to the hybrid machine 17, resulting in a current of approximately 1.7 P.U. Thereafter, the current delivered by the power source 33 decreases exponentially until pull-in or synchronous operation of the hybrid machine 17 is achieved at a time $T=t_4$.

This transient is again encountered at the time $t_1$ when the main generator field and armature windings are provided power by the AC source 33. Thereafter, the current delivered by the external power source 33 decreases until the torque link 12 is closed, at which point a further transient is developed. Following this point in time, the current supplied by the external power source 33 is approximately the same as described in connection with FIG. 6b.

It can be seen from FIG. 6c that the largest magnitude transient in the power delivered by the external AC power source 33 is less than ⅓ the transient produced by the prior art system and method. This reduction in the transient magnitude renders the starting system useable with a greater variety of external AC power supplies, such as portable ground power carts and the like.

The starting system and method may also incorporate motor power factor control circuitry similar to that disclosed in the applicant's copending application Ser. No. 063,296, filed June 17, 1987, entitled "Prime Mover Starter System and Method" and assigned to the assignee of the Instant application (Sundstrand Docket B02405-AT1-USA), the disclosure of which is hereby incorporated by reference. The unity power factor control circuit senses the input current, input voltage and input watts to the main generator 15 and controls the DC power applied to the exciter field winding 52 by the DC power supply 50 or by the AC power supply 33, the rectifvier 19 and the regulator 20 to keep the power factor of the main generator 15 at unity.

Inasmuch as the unity power factor control circuitry is optional, it will not be described in greater detail herein.

It should be noted that the switches SW1–SW8 and torque link actuator 60 may be manually operated or may be automatically controlled by a start control circuit 61. In the case of automatic control, the circuit 61 may be reponsive to closing of a start switch SW9 to initiate a starting operation and may thereafter be responsive to the speed of the prime mover and the speed of the shaft 18. Also, if the AC power supply 33, the rectifier 19 and the regulator 20 are to provide controlled DC power to the exciter field winding 52, three additional switches or contactors are needed to connect the power supply 33 to the rectifer 19 while in the starting mode and to disconnect the power supply 33 from the rectifier 19 once self-sustaining speed is reached. These additional switches may also be controlled by the start control circuit 61.

Referring again to FIGS. 3–5, the hybrid machine rotor 34 further includes flux barriers 62 adjacent each of the magnets 36a–36d which minimize leakage flux. A main portion 64 of the rotor 34 comprises a lamination stack fabricated of soft iron or other magnetically permeable material. The slots 40 may additionally have a slight pitch over the axial extent of the main portion 64 to prevent cogging and cusps.

The entire rotor is encased by a non-magnetic retaining sleeve 68 (FIGS. 3 and 4) which prevents the rotor from separating or fracturing at high rotational speeds.

Since the electrically conductive bars 42 of the squirrel cage winding are disposed only in the interpole regions, the magnets 36a–36d may extend fully to the outer periphery of the rotor 34. Thus, the air-gap length is effectively reduced as compared with other hybrid machine rotors, such as that disclosed in Steen identified above.

We claim:

1. A starting system for starting a prime mover selectively coupled to a rotor of a generator by an actuable torque link, the generator including a field winding disposed on the rotor and at least one armature winding disposed in a stator, comprising:
   a hybrid permanent magnet/induction machine having a rotor coupled to the generator rotor and stator windings disposed in a stator;
   a source of AC power selectively connectable to the stator windings of the hybrid machine to accelerate the hybrid machine rotor in an induction mode to a synchronous speed at which time the machine operates in a synchronous mode as a motor to rotate the generator rotor at a particular speed; and
   means for applying power to the generator field winding and to the generator armature windings once the generator rotor is rotating at the particular speed so that the generator operates as a synchronous motor whereupon the torque link is actuated to connect the generator to the prime mover to bring the prime mover up to self-sustaining speed.

2. The starting system of claim 1, wherein the hybrid machine includes at least two permanent magnets and a squirrel-cage winding disposed on the rotor thereof.

3. The starting system of claim 2, wherein the permanent magnet includes two poles separated by interpole regions and wherein the squirrel-cage winding is disposed in the interpole regions.

4. The starting system of claim 1, wherein the main generator is a synchronous machine having a synchronous speed equal to the synchronous of the hybrid machine.

5. A method of starting a prime mover using a main generator selectively coupled to the prime mover by an actuable torque link, a hybrid permanent magnet/induction machine having a rotor coupled to a rotor of the main generator and a stator having a winding therein, the main generator including field and armature windings, the method comprising the steps of
   (a) applying AC power to the hybrid machine stator winding so that the hybrid machine initially acts as an induction motor to accelerate the hybrid machine rotor, following which the hybrid machine acts as a synchronous motor to rotate the main generator rotor at a particular speed;
   (b) applying DC power to the main generator field winding and AC power to the main generator armature windings once the main generator rotor is rotating at the particular speed so that the main generator operates as a synchronous motor; and
   (c) actuating the torque link once the main generator is operating as a synchronous motor to bring the prime mover up to self-sustaining speed.

6. The method of claim 5, wherein the step (a) includes the step of providing AC power at a constant frequency to the hybrid machine and the step (b) includes the step of applying AC power at the constant frequency to the main generator armature winding.

7. The method of claim 5, wherein the main generator is a synchronous machine leaving a synrhconous speed and wherein the particular speed of the main generator rotor is equal to its synchronous speed.

* * * * *